Patented June 3, 1930

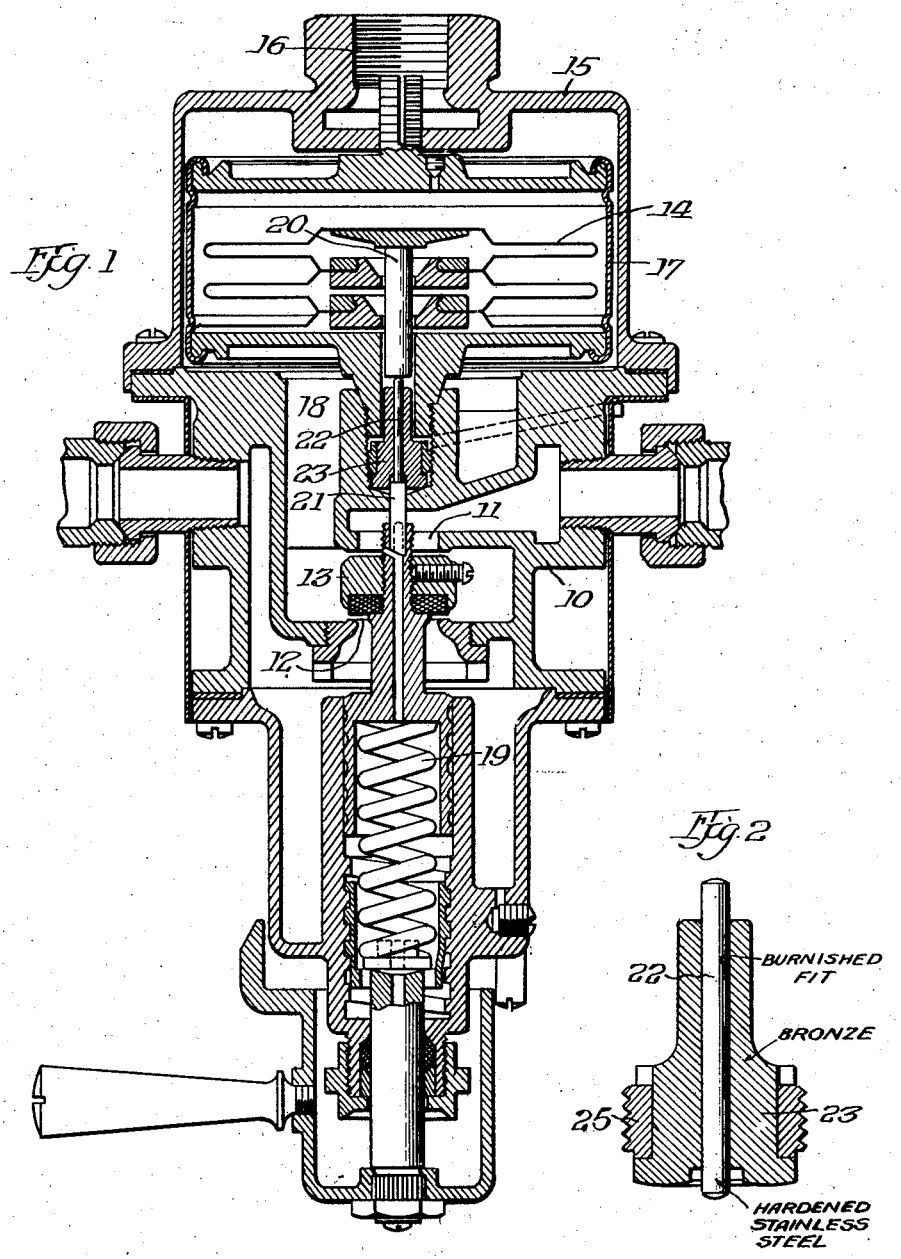

1,761,300

UNITED STATES PATENT OFFICE

ALBIN J. HEMINGS, OF CHICAGO, ILLINOIS, ASSIGNOR TO POWERS REGULATOR COMPANY, OF CHICAGO, ILLINOIS, A CORPORATION OF ILLINOIS

THERMOSTATIC REGULATOR

Application filed October 22, 1928. Serial No. 314,281.

My invention relates to regulating devices and particularly to novel means for use in controlling the valve used in such devices. The device here disclosed is an improvement on that shown in the prior patent of Powers and Snediker, No. 1,455,934, of May 22, 1923.

In the patented construction, and in all devices of a similar nature, the valve which controls the passage of the respective fluids into the mixing chamber is positioned by a thermostatic element, that is in the passage for the mixed fluids, but is independent of the pressure of the fluids. This necessitates a packing gland at the point where the thermostatic plunger passes through the dividing wall of the casing.

Notwithstanding the utmost care in design, construction and fitting, the packing requires tightening at intervals to prevent leakage. This operation is difficult due to the location of the gland, the adjustment requiring the removal of the bonnet and the thermostat, and the adjustment of the packing gland without any means of testing the joint without completely restoring the parts to their original position.

An object of the invention is to provide means that shall entirely eliminate the packing gland and which may be installed in the shop with the assurance that it will function without leakage throughout the normal life of the regulator. The result is accomplished by providing a connection between the thermostat and the valve in the form of a relatively very small, hardened, stainless steel pin, and supporting and guiding the pin in a bronze, or similar metal bushing having an effective length almost equal to the pin, the pin and bushing having a burnished metal to metal fit. By this means a fluid tight joint is provided, in fact, one that will not show any trace of leakage at high steam pressures. The size of the pin and the length of its bearing in the bushing are important factors, and by making the pin quite small in diameter, and supporting it throughout substantially its entire length, the desired result is secured.

The invention will be more readily understood by reference to the accompanying drawing in which Fig. 1 is a vertical sectional view through a regulator to which my invention has been applied, and Fig. 2 is an enlarged sectional view through the bushing and pin of my invention.

The regulator to which my improvement has been applied comprises a casing 10 having a cold fluid inlet port 11, a hot fluid inlet port 12, a valve 13 reciprocable between said ports, and a thermostatic bellows 14.

A bonnet 15 has a mixed fluid outlet 16, and a rigid housing 17 for the thermostat is seated within the bonnet. The fluid received in the mixing chamber 18 passes out around the walls of the housing 17 and affects the thermostatic fluid contained in the housing, thereby effecting movement of the bellows 14. A compression spring 19 tends to move the valve upwardly against the pressure developed in the thermostat.

A plunger 20 directly contacts the top wall of the bellows 14 and a further plunger 21 contacts and acts as an extension of a valve stem which carries the valve 13. A hardened stainless steel pin 22 of comparatively small diameter connects the plungers 20—21 and transmits the thrusts applied thereto. This pin is supported in a bronze bushing 23, the bushing being received in a recess in the casing and held in place by a nut 25. In construction the pin and bushing have a burnished metal to metal fit in other words, the opening through the bushing is reamed until the pin can be driven in. The parts are thereafter rotated and reciprocated without the use of an abrasive until a mirror-like surface is produced, and until the friction of the parts is only slightly greater than that sufficient to hold the parts against separation by gravity when in a vertical position. When so-fitted, the joint will be found to be tight under relatively high pressures, and will remain in this condition indefinitely. Such results cannot be secured by the use of other than a comparatively small pin and by providing a relatively long bearing surface for the pin.

An important point is that the bushing and pin shall be composed of metals of dissimilar composition; this is essential for if the same metals are used for both elements, a sufficiently close fit to insure against leakage will result in seizure at the least provocation. As heretofore stated, the bushing is preferably composed of bronze and the pin of so-called "stainless" steel, the two metals having no affinity that will cause adhesion under the described conditions.

Obviously, the improvement is particularly advantageous in connection with a construction such as described in which the movable member is remote and difficult of access, but it may also be used to advantage in other constructions in which this element is not so pronounced, and I do not wish to be limited except as indicated in the appended claims.

I claim:

1. In combination, a casing having hot and cold fluid ports and a mixing chamber, a valve movable between said ports to vary the proportion of the respective fluids admitted to said chamber, a bonnet having a mixed fluid outlet, a rigid thermostatic casing in said bonnet, a bellows in said thermostatic casing, a plunger operated by said bellows, a relatively long bushing, and a hardened steel pin connecting said plunger to said valve, said pin being supported throughout substantially its entire length in said bushing and having a burnished fit therein, thereby avoiding the use of packing.

2. In a device for controlling the passage of fluids, the combination with a casing and a valve of means exterior to said casing for effecting movement of said valve, a relatively long, small diameter pin connecting said valve to said valve moving means, and means composed of a different metal for supporting said pin throughout substantially its entire length, said pin and supporting means having a burnished metal to metal fit.

3. In a device for controlling the passage of fluids, the combination with a casing and a valve of means exterior to said casing for effecting movement of said valve, a relatively long, small diameter stainless steel pin connecting said valve to said valve moving means, and means composed of different metal for supporting said pin throughout substantially its entire length, said pin and supporting means having a burnished metal to metal fit.

4. In a device for controlling the passage of fluids, the combination with a casing and a valve of means exterior to said casing for effecting movement of said valve, a relatively long, small diameter stainless steel pin connecting said valve to said valve moving means, and a bronze bushing of a length to engage and support said pin throughout substantially its entire length, said pin and bushing being so closely fitted as to require no packing and yet relatively freely movable.

In testimony whereof he has affixed his signature.

ALBIN J. HEMINGS.